United States Patent
Sanz et al.

(10) Patent No.: US 9,452,399 B2
(45) Date of Patent: Sep. 27, 2016

(54) PNEUMATIC SYSTEM FOR DENSE LOADING OF CATALYST INTO BAYONET TUBES FOR A STEAM REFORMING EXCHANGER-REACTOR USING AN AUXILIARY TUBE FOR INTRODUCING SOLID PARTICLES

(71) Applicant: IFP ENERGIES NOUVELLES, Rueil-Malmaison (FR)

(72) Inventors: Elena Sanz, Lyons (FR); Robert Beaumont, Rillieux la Pape (FR); Christophe Boyer, Charly (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 14/435,480

(22) PCT Filed: Sep. 24, 2013

(86) PCT No.: PCT/FR2013/052244
§ 371 (c)(1),
(2) Date: Apr. 14, 2015

(87) PCT Pub. No.: WO2014/060672
PCT Pub. Date: Apr. 24, 2014

(65) Prior Publication Data
US 2015/0298085 A1    Oct. 22, 2015

(30) Foreign Application Priority Data
Oct. 17, 2012 (FR) ..................... 12 02773

(51) Int. Cl.
*B65B 1/04* (2006.01)
*B01J 8/00* (2006.01)
*B01J 8/06* (2006.01)

(52) U.S. Cl.
CPC ............... *B01J 8/0025* (2013.01); *B01J 8/002* (2013.01); *B01J 8/003* (2013.01); *B01J 8/06* (2013.01); *B01J 2208/00752* (2013.01); *B01J 2208/00778* (2013.01)

(58) Field of Classification Search
CPC ........ B01J 8/0025; B01J 8/002; B01J 8/003; B01J 2208/00752; B01J 2208/00778
See application file for complete search history.

(56) References Cited

U.S. PATENT DOCUMENTS

| 6,467,513 B1* | 10/2002 | Yanaru | B01J 8/002 141/12 |
| 8,578,978 B2* | 11/2013 | Sanz | B01J 8/002 141/1 |
| 2011/0083769 A1 | 4/2011 | Sanz et al. | |

FOREIGN PATENT DOCUMENTS

| EP | 1374985 A1 | 1/2004 |
| FR | 2950822 A1 | 4/2011 |
| WO | 2005053833 A1 | 6/2005 |

OTHER PUBLICATIONS

International Search Report and Search Opinion from PCT/FR2013/052243 dated Jan. 15, 2014.

*Primary Examiner* — Jason K Niesz
(74) *Attorney, Agent, or Firm* — Millen White Zelano & Branigan, P.C.

(57) ABSTRACT

The present invention describes a device and a method for dense and homogeneous loading of catalyst into the annular space 4 of bayonet tubes defined by an external tube 6 and an internal tube 5 used in a steam reforming reactor, said device using a rigid auxiliary tube 7 for introducing solid particles into said annular zone 4.

2 Claims, 1 Drawing Sheet

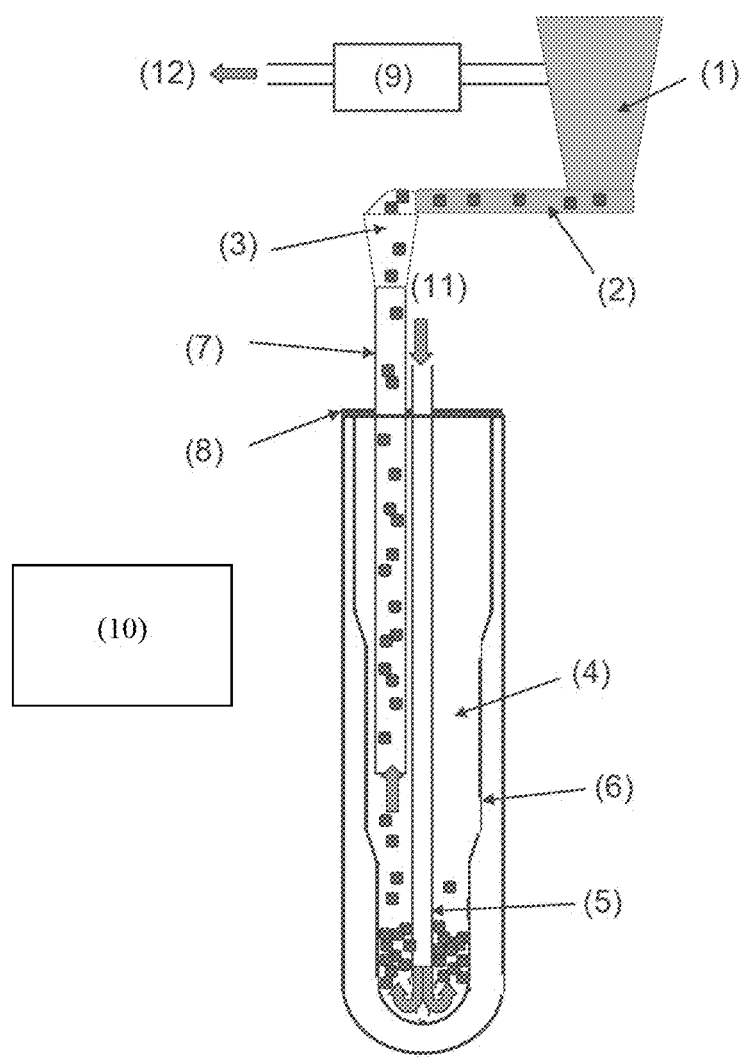

PNEUMATIC SYSTEM FOR DENSE LOADING OF CATALYST INTO BAYONET TUBES FOR A STEAM REFORMING EXCHANGER-REACTOR USING AN AUXILIARY TUBE FOR INTRODUCING SOLID PARTICLES

FIELD OF THE INVENTION

The present invention relates to the field of loading catalytic tubes used in tubular reactors employing highly endothermic or highly exothermic reactions. Thus, the present invention is particularly suitable for a reactor for steam reforming natural gas or various hydrocarbon cuts with a view to producing the $CO+H_2$ mixture known as synthesis gas.

Two major families of steam reforming reactors can be distinguished:

Reactors in which the heat is supplied by a series of burners located inside the reactor, and those in which the heat is supplied via a heat transfer fluid, generally combustion fumes, said combustion taking place outside the steam reforming reactor per se.

Certain reactors of this latter type, which will hereinafter be denoted exchanger-reactors, employ simple tubes. Others use double-walled concentric tubes which are also known as bayonet tubes. A bayonet tube can be defined as an inner tube surrounded by an outer tube which is coaxial with the inner tube, the annular space between the inner tube and the outer tube generally being filled with catalyst. In the remainder of the text, the term "annular space" or "catalytic zone" will be used to designate said annular space defined by the bayonet tubes.

In the context of the present invention, natural gas, or more generally the hydrocarbon feed, is introduced via the annular zone in a top to bottom flow and the reaction effluents are collected in the central portion of the internal tube in a bottom to top flow.

The reaction for steam reforming natural gas for the production of hydrogen is highly endothermic and thus generally takes place in furnaces or in exchanger-reactors as defined above.

The reaction takes place at very high temperatures, typically 900° C., and under pressures which are typically 20 to 30 bars. Under these conditions, due to the mechanical behaviour of the materials, the reaction can only be carried out under viable economic conditions if it takes place inside tubes.

Catalytic exchanger-reactors are thus constituted by a multitude of tubes, typically of the order of 200 to 350 tubes for units producing 100000 $Nm^3/h$ of hydrogen, this series of tubes being enclosed in a shell which receives the hot fluid, which means that the heat necessary for the steam reforming reaction can be supplied.

This hot fluid or heat transfer fluid is generally constituted by the fumes from a combustion which has taken place outside the exchanger-reactor.

Thus, the catalyst has to be installed in all of the steam reforming tubes in a regular manner from one tube to another, in order to have an identical pressure drop from one tube to another.

This condition is very important in guaranteeing a good distribution of reagents over the series of catalytic tubes and to prevent one tube from being undersupplied, for example, which could result in major overheating of the material constituting the tube, this overheating substantially reducing the service life of the tube.

Similarly, it is important that no voids, i.e. areas without catalyst or depleted in catalyst, subsist in the tube as again, the tube could overheat locally in the absence of a catalytic reaction inside it. In addition, any heterogeneity in the distribution of the catalyst in the reaction zone could result in an unbalanced flow of reaction fluid or fluids.

Thus, the aim of the device of the invention is to allow loading which is both dense and homogeneous over each of the bayonet tubes forming part of the exchanger-reactor.

EXAMINATION OF THE PRIOR ART

This examination shall be limited to a pneumatic type loading device.

The Applicant's patent FR 2 950 822 describes a solution for loading bayonet tubes with 3 loading tubes, with mechanical brakes or pneumatic braking. That loading method can be used to produce dense, uniform loading of the bayonet tubes. It is a "grain by grain" method and thus turns out to be too slow and poorly suited for use on the scale of an industrial reactor comprising several hundred tubes.

Patent EP 1 374 985 describes a loading system with a removable tube for introducing a flow of air as a countercurrent which brakes the fall of the particles. That system applies to conventional natural gas steam reforming tubes but it cannot accommodate the specific requirements of bayonet tubes.

None of the documents found concerns an application to bayonet tubes when an annular zone is loaded.

The device of the present invention can thus be defined as a pneumatic device for dense loading of catalyst into the annular zone of bayonet tubes provided in a steam reforming exchanger-reactor, the device being used to obtain a homogeneous loading density in each of the tubes of the exchanger-reactor within a time period which is compatible with the demands of industrial scale start-up.

In addition, in a certain number of cases, the device of the invention must be able to be adapted to variations in the internal diameter of the external tube 6, imposed by mechanical and thermal stresses which change along the tube, and thus change the dimensions of the annular zone. None of the prior art devices takes this supplemental constraint into account.

BRIEF DESCRIPTION OF THE FIGURES

FIG. 1 represents the device of the invention and shows the rigid auxiliary tube 7 in sections which can be used to introduce solid particles into the annular zone 4, as well as the system for winding it up.

BRIEF DESCRIPTION OF THE INVENTION

The present invention can be defined as a pneumatic device for densely filling catalyst into a steam reforming exchanger-reactor consisting of a plurality of bayonet tubes enclosed in a shell, each bayonet tube comprising an annular zone which is at least partially filled with catalyst. Said catalyst is constituted by solid particles occupying at least part of the annular space 4 included between an internal tube 5 and an external tube 6, the assembly of these two tubes constituting the bayonet tube, the width of said annular space being in the range 30 mm to 80 mm, and its height being in the range 10 to 20 meters.

The catalyst particles are generally in the form of cylinders with an approximate height of 10 mm to 20 mm and an approximate diameter of 5 mm to 20 mm.

In its basic version, the device of the present invention consists of:

- a rigid auxiliary tube 7 divided into a plurality of sections, penetrating inside the annular zone 4 and maintained at a distance from the surface of the bed being formed in the range 50 mm to 150 mm, said tube supplying solid particles to the annular zone 4 as a counter-current to a flow of slowing gas which is being introduced via the internal tube 5,
- said rigid auxiliary tube 7 being capable of being dismantled into sections with a length in the range 50 cm to 200 cm, and the particles of catalyst being contained in:
- a central feed hopper 1 for delivering the particles onto a conveyor belt or a shaker conveyor 2 supplying the auxiliary tube 7 via
- a funnel 3, via which the particles flow into the interior of the auxiliary tube 7.

Two or three identical rigid tubes 7 operating in parallel may be used, depending on the flow rates of the solid particles to be loaded. In the remainder of the text, the term "rigid auxiliary tube 7" should thus be understood to mean a rigid auxiliary tube or tubes 7.

This group of rigid tubes 7 operating in parallel may be supplied via a single feed hopper.

The present invention also concerns a method for loading catalyst using the device described above, which method can be described by the following series of steps:

- the rigid auxiliary tube 7 is initially dismantled into sections and is outside the bayonet tube, the feed hopper 1 being filled with solid;
- the rigid auxiliary tube 7 is gradually introduced into the annular zone 4 via its upper portion, adding sections until its lower end is positioned at a distance in the range 50 cm to 100 cm with respect to the bottom of the tube;
- a constant flow of gas is introduced via the central tube 5, passes into the annular space and rises inside the auxiliary tube, the flow rate of gas being such that it generates a speed inside the auxiliary tube in the range 8 m/s to 14 m/s;
- the conveyor belt or the shaker conveyor 2 is started up so as to provide a flow rate of solid in the range 150 kg/h to 500 kg/h, preferably in the range 250 kg/h to 500 kg/h, the flow of solid being introduced into the auxiliary tube 4 via the funnel 3;
- the grains of solid are slowed down inside the auxiliary tube and fall onto the surface of the bed being formed which fills the annular zone 4;
- as and when the annular zone 4 is filled, the rigid auxiliary tube 7 is raised in the annular zone 4 by removing sections so as to keep the distance with respect to the surface of the bed which is gradually being formed constant, said distance always being in the range 50 cm to 150 cm;
- the rigid auxiliary tube 7 is withdrawn at a speed equivalent to the speed of loading of the tube in the range 0.1 m/min to 0.4 m/min, preferably in the range 0.2 meter/min to 0.4 meter/min;
- once the bayonet tube has been loaded and the loading system has been withdrawn, the loading system is displaced in order to load the next tube.

When a group of rigid tubes 7 operating in parallel is used, the group of tubes 7 is displaced in order to supply the other group of bayonet tubes.

In general, the gas used to carry out the method of the invention is air or nitrogen.

Detailed Description of the Invention

The present invention can be defined as a device for the dense loading of catalyst into the annular space 4 of bayonet tubes, each bayonet tube having a height in the range 10 m to 20 m, a diameter of the external tube 6 in the range 250 mm to 150 mm, and an external diameter of the internal tube 5 in the range 10 to 40 mm.

The annular space 4 containing the catalyst thus has a characteristic width of approximately 50 mm. In practice, depending on the case, the characteristic width of the annular space 4 can vary between 30 mm and 80 mm.

In addition, in some cases, the external tube 6 has a diameter which decreases from top to bottom in sections, which means that the characteristic width of the annular space 4 also reduces from top to bottom.

The device of the invention can very easily adapt to variations in the characteristic width while conserving its performance over the whole set of sections.

The grains of catalyst are generally in the form of cylinders approximately 10 mm to 20 mm in height and 5 mm to 20 mm in diameter.

One of the major problems posed by loading them into tubes more than 10 meters in length is the risk of these grains breaking if they are simply allowed to fall freely without taking any precautions; this is one of the solutions of the prior art for producing a dense loading. In general, the risk of breakage of the grains is high beyond a drop height of 1 meter.

Other problems are linked to the geometry of the annular catalytic space itself, which prohibits the passage of conventional loading systems.

In a frequent case in the context of the present invention, an internal tube 5, which passes through the external tube 6 in the upper portion of the annular zone 4 to provide an outlet which is completely free of reaction effluents, has to be contended with.

Finally, as indicated in the prior art, the risk of arching over is accentuated when the ratio between the diameter of the tube and the principal dimension of the particles is less than 8, which is often the case in the context of the present invention since the typical width of the annular space (50 mm) equates to about 4 times the characteristic diameter of the particles of catalyst.

A major constraint which the loading device must also accommodate is that loading is carried out tube by tube, and so it has to be sufficiently rapid for industrial application, since a steam reforming reactor aiming at a production of approximately 100000 Nm$^3$/h of H$_2$ has approximately 200 to 350 bayonet tubes.

The present invention describes a system for loading a bayonet tube by means of a flow of gas, generally air, as a counter-current to the fall of the particles, which thus slows down the fall of said particles, thereby preventing them from breaking, and results in homogeneous loading without clogging.

The terminal velocity for the fall of the grains under consideration is approximately 14 m/s. To prevent the grains from breaking, the particles have to fall at a speed of less than 3 m/s, preferably less than 2 m/s.

The speed of the gas which is a counter-current to the fall of the particles must be in the range 11 m/s to 13 m/s in order to slow down the fall of the particles. Obtaining such a speed throughout the annular space 4 would necessitate a very high gas flow rate. Introducing such a flow rate via the internal tube 5, which typically has a diameter in the range 30 mm to 50 mm, can generate very high speeds inside this tube, which could even result in a sonic flow.

In the present invention, the flow of gas necessary to slow down the particles in a suitable manner is introduced in an integral manner via the internal tube 5, but the solid particles are fed into the annular zone 4 via a rigid auxiliary tube 7 the diameter of which is between 0.5 and 0.9 times the width of the annular space 4, more precisely the smallest of the annular spaces 4 in the case of a tube with a change in internal diameter of the external tube 6. This rigid auxiliary tube 7 is divided into several sections so as to allow it to be dropped to the bottom of the annular zone 4 when loading begins then to allow it to be withdrawn gradually during loading of said annular zone 4.

The flow of gas inside the internal tube 5 is such that:
on the one hand the speed generated in the rigid auxiliary tube 7 is in the range 8 m/s to 14 m/s, preferably in the range 11 m/s to 13 m/s;
on the other hand, the upward speed generated in the annular zone is less than the minimum fluidization speed of the solid particles, in the range 3 m/s to 4 m/s, in order to maintain the bed of particles being formed in the fixed bed state, but to carry away fine particles which could be generated during loading.

Loading is carried out loose via the upper opening of the auxiliary tube or tubes by means of a loading feed hopper 1 and a shaker conveyor or conveyor belt 2.

Between the shaker conveyor 2 and the rigid auxiliary tube 7, a flexible coupling 3 is used to channel the particles of catalyst while preventing the transmission of vibrations to the rigid auxiliary tube.

The flow of gas leaving the rigid auxiliary tube 7, loaded with fine particles, passes through a filter 9 which retains the dust and expels a clean gas 12. A sealing system 8 ensures that the gas only passes through the system for solid loading and filtration 9.

The variations in section of the annular zone 4 do not have any more influence on the flow rate of the air to be introduced via the internal tube 5, which remains constant throughout loading, which means that the present device is particularly well suited to the geometries of tubes with a variation in the dimension of the annular zone 4.

In some embodiments, the rigid auxiliary tube (7) can be raised from the annular zone (3) by removing sections with the aid of the external winding system (10) so as to keep the distance with respect to the surface of the bed which is gradually being formed constant.

Example of the Invention

Loading tests were carried out with the pneumatic device of the invention disposed in an experimental 1 m high column constituted by an internal tube 5 with an external diameter of 42 mm and an internal diameter of 32.2 mm, and an external tube 6 with an internal diameter of 128.1 mm.

The solid particles to be loaded were in the shape of small cylinders with a height of 1.5 cm and a diameter of 0.8 cm.

The total length of the auxiliary loading tube 7 was 6.2 m and the diameter was 5 cm.

The distance between the lower end of the rigid auxiliary tube 7 and the surface of the bed being formed was kept equal to 50 cm during loading.

A flow rate of air of 76.3 m$^3$/h was introduced via the internal tube of the bayonet, which generated a loading speed inside the rigid auxiliary tube 7 of 10.8 m/s.

The speed inside the internal tube 5 of the bayonet was 26 m/s.

The upward speed through the bed of solid particles was 2 m/s, i.e. below the minimum fluidization speed.

The pneumatic device was continuously lifted at a speed of 0.2 m/min.

Once the bed had been loaded, the ΔP was measured with a flow of air of 130 Nm$^3$/h.

After unloading, the broken particles were isolated from the batch. The amount of breakage was very small, of the order of 0.7%.

The results of loading are shown in Table 1 below.

The loading obtained with this system was highly satisfactory, with an excellent reproducibility in terms of pressure drop (standard deviation of approximately ±3%).

The loading time was between 5 and 6 minutes/meter, which corresponded to a filling time of approximately 66 minutes for a 12 m tube (for a solid flow rate of approximately 180 kg/h).

The loading density was approximately 970 kg/m$^3$, fairly reproducibly across all of the loads.

TABLE 1

Results of loading with a pneumatic system with an auxiliary loading tube on a 1 m model.

| Loading time (min) | Height of solid (cm) | Density of loading (kg/m$^3$) | Pressure drop (mm H$_2$O) | Standard deviation | Amount of breakage |
|---|---|---|---|---|---|
| 5'00" | 98 | 968 | 260 | 0.5% | 0.76% |
| 5'42" | 97 | 978 | 266 | 2.8% | 0.78% |
| 6' | 98 | 968 | 250 | −3.3% | 0.69% |

Mean pressure drop 258.6

The invention claimed is:

1. A method for loading catalyst using a pneumatic device for densely filling catalyst into a steam reforming exchanger-reactor consisting of a plurality of bayonet tubes enclosed in a shell, the catalyst being constituted by particles occupying at least part of the annular space (4) included between an internal tube (5) and an external tube (6), the assembly of these two tubes constituting a bayonet tube, the width of said annular space being in the range 30 mm to 80 mm, and its height being in the range 10 to 20 meters, the catalyst particles being in the form of cylinders with an approximate height of 10 mm to 20 mm and with an approximate diameter of 5 mm to 20 mm, the device consisting of:

at least one rigid auxiliary tube (7) penetrating inside the annular zone (4) and maintained at a distance from the surface of the bed being formed which is in the range 50 mm to 150 mm, with a diameter in the range 0.5 to 0.9 times the width of the annular space (4), said rigid auxiliary tube (7) allowing the introduction of solid particles to be loaded into the annular zone (4) and being traversed by a counter-current flow of gas introduced via the internal tube (5);

said rigid auxiliary tube (7) being divided into a plurality of sections with a length in the range 50 cm to 200 cm, which are placed end to end at the start of loading, then gradually withdrawn as and when the bed of particles is formed so as to maintain the desired distance with respect to the surface of the bed, and the particles of catalyst being contained in:

a central feed hopper (1) for delivering the articles to a shaker conveyor or a conveyor belt (2) supplying the auxiliary tube (7) via:

a funnel (3), via which the particles flow into the interior of the annular space (4); wherein said method comprises:

the rigid auxiliary tube (7) is initially dismantled into sections and is outside the bayonet tube, the feed hopper (1) being filled with solid;

the rigid auxiliary tube (7) is gradually introduced into the annular zone (4) by placing the necessary number of sections end to end so that its lower end is positioned at a distance in the range 50 cm to 100 cm with respect to the bottom of the annular zone (4);

a suitable flow of gas is introduced in its entirety into the internal tube (5);

the conveyor belt or the shaker conveyor (2) is started up so as to provide a flow of solid in the range 150 kg/h to 500 kg/h, preferably in the range 250 kg/h to 500 kg/h, said solid particles being introduced into the annular zone (4) via the rigid auxiliary tube (7);

as and when the annular zone (4) is filled, the rigid auxiliary tube (7) is raised from the annular zone (4) by removing sections with the aid of an external winding system (10) so as to keep the distance with respect to the surface of the bed which is gradually being formed constant, said distance always being in the range 50 cm to 150 cm;

the rigid auxiliary tube (7) is withdrawn at a speed equivalent to the speed of loading of the tube in the range 0.1 m/min to 0.4 m/min, preferably in the range 0.2 to 0.4 m/min;

once the bayonet tube has been loaded and the loading system has been withdrawn, the rigid auxiliary tube (7) is displaced in order to load the next tube.

2. The catalyst loading method according to claim 1, in which the gas used is air or nitrogen.

* * * * *